United States Patent [19]

Eslambolchi

[11] Patent Number: 5,627,889
[45] Date of Patent: May 6, 1997

[54] SERVICE RESTORATION TECHNIQUE FOR TELECOMMUNICATIONS FACILITIES HAVING A SINGLE DEGREE OF FREEDOM

[75] Inventor: Hossein Eslambolchi, Basking Ridge, N.J.

[73] Assignee: AT&T, Middletown, N.J.

[21] Appl. No.: 496,786

[22] Filed: Jun. 29, 1995

[51] Int. Cl.$^6$ .............. H04M 7/00; H04M 3/00; H04J 1/16; H04J 3/14
[52] U.S. Cl. .............. 379/221; 370/217; 379/273
[58] Field of Search .............. 370/16, 54; 379/219, 379/220, 221, 229, 270, 271, 272, 273

[56] References Cited

U.S. PATENT DOCUMENTS

| | | | |
|---|---|---|---|
| 3,864,533 | 2/1975 | Erlund | 379/221 X |
| 5,182,744 | 1/1993 | Askew et al. | 370/16 |
| 5,193,086 | 3/1993 | Satomi et al. | 370/16 |
| 5,465,294 | 11/1995 | Chapman, Jr. et al. | 379/221 X |

*Primary Examiner*—Krista M. Zele
*Assistant Examiner*—Harry S. Hong
*Attorney, Agent, or Firm*—Robert B. Levy

[57] ABSTRACT

A technique is provided for re-routing telecommunications traffic that is originally destined for passage between an inter-exchange carrier, via a first gateway POP (18) at a first local exchange ($12_1$), and a second local exchange ($12_5$) that is dead-ended because of a single local trunk (16) coupling it to the first exchange. Such re-routing is accomplished, in the event of a failure of the local trunk (16), by providing an optical switch (24) at the dead-ended local exchange ($12_5$) for routing traffic onto and off an express traffic link (20) passing through the exchange between the first gateway POP (18) and a second gateway POP (18) of the inter-exchange carrier. In this way, traffic can be routed by the inter-exchange carrier, via its second gateway POP (18), to and from the dead-ended local exchange ($12_5$) without the need to physically restore the failed local trunk (16).

8 Claims, 1 Drawing Sheet

# SERVICE RESTORATION TECHNIQUE FOR TELECOMMUNICATIONS FACILITIES HAVING A SINGLE DEGREE OF FREEDOM

TECHNICAL FIELD

This invention relates to a method and apparatus for restoring service to a local telecommunications exchange served by an inter-exchange carrier via a single communications channel.

BACKGROUND ART

Presently, inter-exchange carriers, such as AT&T, carry telecommunications traffic between two local telephone exchanges that are not within the same Local Telephone Access Area (LATA). To carry inter-LATA traffic (as well as intra-LATA traffic where permitted), an inter-exchange carrier typically has a gateway Point of Presence (POP) (i.e., a connection point) within a local exchange that serves as a point of entry to, or egress from, the inter-exchange carrier's network. In the case of AT&T, each of its gateway POPs is connected to other gateway POPs in a star-like arrangement by one or more express traffic links, typically fiber optic cables. These express traffic links may pass through one or more local exchanges that are devoid of a gateway POP. Traditionally, no connection exists between such an express traffic link and the local exchange unless the exchange contains a gateway POP. Thus, inter-LATA traffic from a local exchange devoid of a gateway POP of an inter-exchange carrier must pass to a local exchange where the carrier has such a gateway POP if such traffic is to pass over the inter-exchange carrier's network.

Should an express traffic link between two gateway POPs fail, (e.g., become severed or otherwise be unable to carry its normal volume of traffic), then telecommunications traffic can be routed around such a failed link through other gateway POPs in the inter-exchange carrier's network. An example of one such restoration technique is described in U.S. Pat. No. 5,182,733, issued on Jan. 26, 1993, in the name of J. Askew et al., and assigned to AT&T. Using the technique described in the Askew et al. patent, a service disruption between two inter-exchange POPs can be restored relatively quickly, thus preventing significant call blockage, and the attendant loss of revenue associated with such call blockage.

In some telecommunications networks, a gateway POP at a local exchange is connected, via a single local trunk (e.g., a fiber optic or copper cable) that terminates or "dead-ends" at one or more downstream local exchanges such that the only link between the gateway POP and the dead-ended local exchange(s) is the local trunk. If the local trunk fails, then no traffic passes between the dead-ended local exchange(s) and the gateway POP of the inter-exchange carrier. Presently, there is no way to route traffic around such a local trunk should it fail. For traffic to pass between the gateway POP and a dead-ended local exchange, the local trunk linking the dead-ended local exchange(s) and the gateway POP must be physically restored, which is a time-consuming task, often taking hours to complete. Until the severed local trunk is repaired, telecommunications traffic remains blocked, causing a loss of revenue both to the local inter-exchange and the inter-exchange carrier.

Thus, there is a need for a technique for restoring service to between a dead-ended local exchange and a gateway POP.

BRIEF SUMMARY OF THE INVENTION

Briefly, telecommunications traffic, unable to pass between a first inter-exchange carrier gateway POP at a first local exchange and a second, dead-ended local exchange because of a failed local trunk therebetween, can be restored by routing such traffic onto an express traffic link passing through the dead-ended local exchange between the first gateway POP and a second gateway POP of the inter-exchange carrier. In the event that the express traffic link comprises an optical fiber, traffic can be routed onto or off the express traffic link via an optical switch actuated in response to a failure of the local trunk linking the dead-ended local exchange and the first gateway POP. After the traffic is routed onto the express-traffic link, then such traffic passes to the second gateway POP and from there to the intended destination of the traffic, whether it be the first local exchange or elsewhere. Conversely, traffic intended for the dead-ended local exchange can be first routed to the second gateway POP and from there to the dead-ended local exchange via the express traffic. In this way, service can be effectively restored to the second, dead-ended local exchange without awaiting physical restoration of the local trunk.

DETAILED DESCRIPTION

Figure 1:
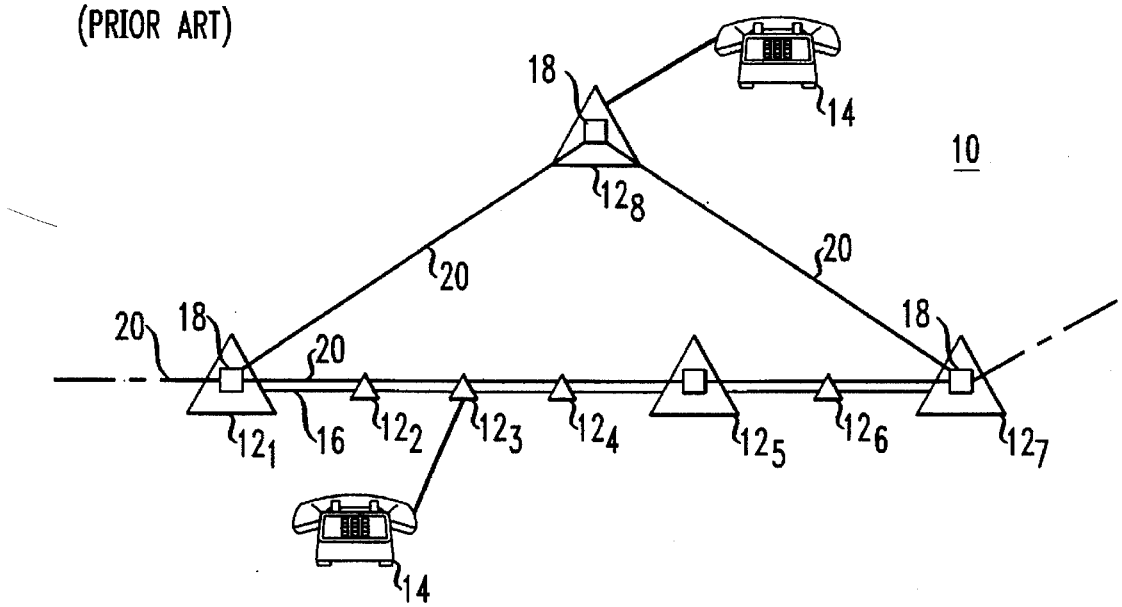
FIG. 1 is a block schematic diagram of a portion of a telephone network in accordance with the prior art.

FIG. 1 shows a block schematic diagram of a prior art telecommunications network 10 comprised of a plurality of local exchanges $12_1$–$12_n$ where n is an integer. In the illustrated embodiment, eight such local exchanges are shown (i.e. n=8), although it should be understood that the network 10 may include a larger or smaller number of exchanges. Each local exchange, such as the local exchange $12_2$, provides local access to a subscriber 14 in a manner described in somewhat greatest detail in FIG. 2. For purposes of illustrating the present invention, the local exchanges $12_1$–$12_5$, are assumed to lie within a Local Telephone Access Area (LATA). To that end, the local exchanges $12_1$–$12_5$ are linked to each other via a local trunk 16, which may take the form of a copper cable or light guide fiber. In this way, telecommunications traffic, such as voice, dam, video or the like, may pass between any of the local exchanges $12_1$–$12_5$.

An inter-exchange carrier, such as AT&T, typically carries telecommunications traffic destined for a local exchange carrier outside the LATA (such as traffic passing among the local exchanges $12_1$, $12_7$ and $12_8$ that lie within different LATAs). To carry such inter-exchange traffic, the inter-exchange carrier has a Point-Of-Presence (POP) 18 within at least one local exchange lying within a LATA (e.g., the local exchanges $12_1$, $12_5$, $12_7$ and $12_8$ in FIG. 1). The nature of the POP 18 within each such local exchange depends on whether the POP is to serve as a gateway for local traffic or not. For example, the POP 18 within each of the local exchanges $12_1$, $12_7$ and $12_8$ is intended as a gateway for local traffic, whereas the POP in the local exchange $12_5$ is not a gateway and typically takes the form of a repeater or regenerator. To distinguish between a POP intended as a gateway, and one that is not, the terms "gateway POP" and "non-gateway POP", respectively, will be used. The gateway POP 18 within each of the local exchanges $12_1$, $12_7$ and $12_8$ typically comprises a toll switch, such as a 4ESS Toil Switch manufactured by AT&T, and associated line terminating` equipment (not shown). Alternatively, the gateway POP 18 may include the combination of a toll switch, a Digital Access Cross-Connect System (DACS), and associated line terminating equipment.

Figure 2:
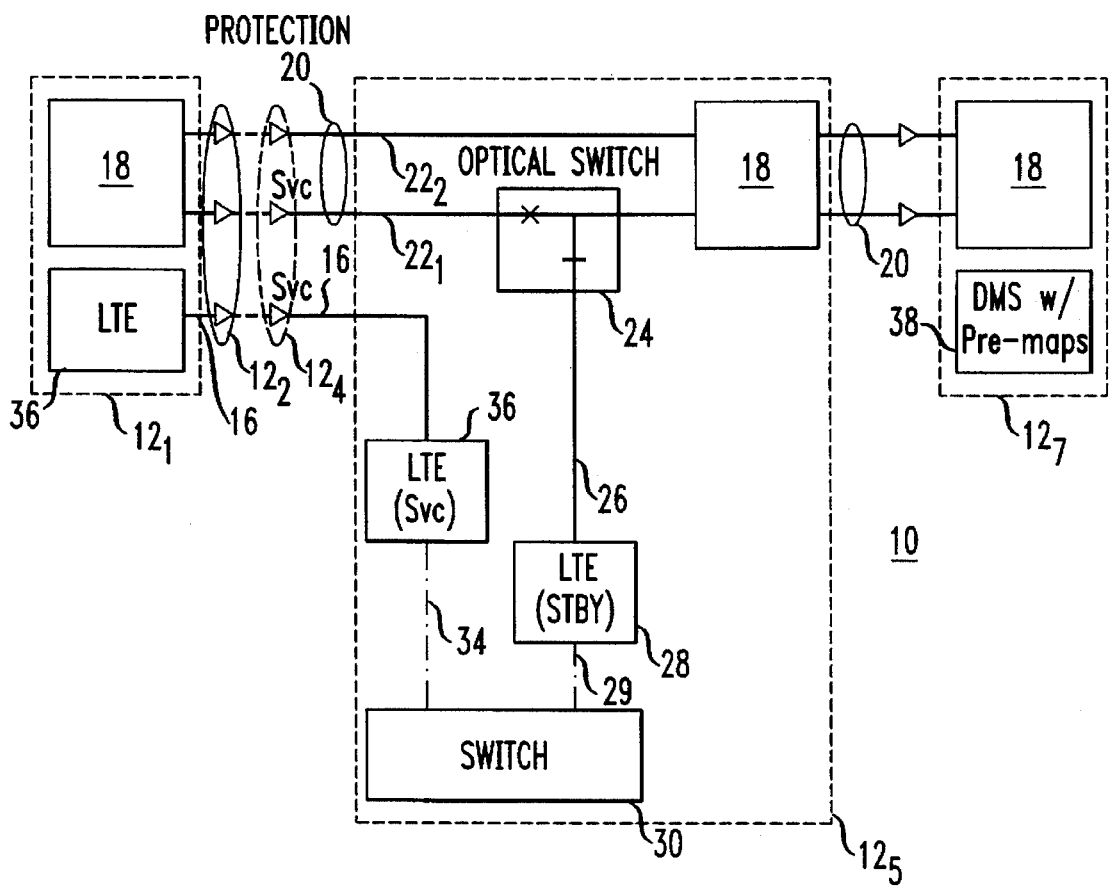
FIG. 2 is a block schematic diagram of a portion of the network of FIG. 1 modified in accordance with the present invention.

To facilitate the transport of inter-exchange traffic, each gateway and non-gateway POP 18 is coupled to at least one other POP by an express traffic link 20, such as a fiber optic cable, or any other type of well-known telecommunications transport mechanism. In practice, the gateway POPs 18—18 are coupled by the express traffic links 20—20 in a star-like arrangement so that each gateway POP is connected to at least two others. In this way, a break in the express traffic link 20 between two gateway POPs 18—18 will not completely disrupt service. If the express traffic link 20 between two gateway POPs 18—18 is severed, then traffic can be routed around the severed express traffic link via other gateway POPs and the express traffic links that connect them. As illustrated in FIG. 2, the express traffic link 20 typically includes two different channels $22_1$ and $22_2$ that may take the form of separate fibers (or bundles of fibers) in an optical fiber cable. The first fiber $22_1$ is designated as the "service" fiber because it carries normal (service) traffic. The second fiber $22_2$ is designated as the protection fiber since it carries traffic only when the other fiber $22_1$ is unavailable or when additional capacity is needed on a temporary basis Referring to FIG. 1, inter-exchange traffic originating at any of the local exchanges $22_2$–$12_5$ must pass via the local trunk 16 to the local exchange $12_1$ that contains a gateway POP 18 in order for the traffic to be routed to the inter-exchange carrier. In the illustrated embodiment, the local trunk 16 connected to the gateway POP 18 in the local exchange $12_1$ terminates or "dead-ends" at the local exchanges $12_2$–$12_5$. For purposes of discussion, the term "dead-ended" will be used to refer to the local exchanges $12_2$–$12_5$ to indicate that each such exchange has but a single link (i.e., local trunk 16) to the gateway POP 18 in the local exchange $12_1$.

As described the express traffic link 20 between the gateway POPs 18—18 in the local exchanges $12_1$ and $12_5$ may pass through the local exchanges $12_2$–$12_5$. However, in the past, there has been no mechanism at any of the dead-ended local exchanges $12_2$–$12_5$ for routing traffic onto or off the express traffic link 20 passing through the dead-ended local exchanges. Rather, the traffic must be routed via the local trunk 16 to the local exchange $12_1$ so that the traffic passes to the gateway POP 18 at that exchange.

As may be appreciated, any failure in that local trunk 16 prevents inter-exchange traffic from passing between the local exchanges $12_2$, $12_3$, $12_4$ and $12_5$ and the gateway POP 18 at the local exchange $12_1$. Thus, if the local trunk 12 becomes severed, inter-exchange traffic to and from the local exchanges $12_2$–$12_5$ becomes blocked. Traditionally, there has been no ability to re-route calls around a failed portion of the local trunk 16. Thus, only when the failed portion of the local trunk 16 is actually repaired will inter-exchange calls pass between the gateway POP 18 in the local exchange $12_1$ and the local exchanges $12_2$–$12_5$.

Referring to FIG. 2, there is shown a portion of the network 10 of FIG. 1, modified in accordance with the present invention, to facilitate the re-routing of inter-exchange traffic to and from the dead-ended local exchanges $12_2$–$12_5$ in the event of a failure of a portion of the local trunk 16. (Note that only the local exchanges $12_2$, $12_4$ and $12_5$ are shown in FIG. 2.) Referring to FIG. 2, the network 10 has been modified, in accordance with the invention, to provide a traffic multiplexing mechanism 24 within one of the dead-ended local exchanges, such as the local exchange $12_5$, for routing local traffic onto the express traffic link 20 in the event of a failure (e.g., disruption) of a portion of the local trunk 16. (In the illustrated embodiment, the local exchange $12_5$ contains a non-gateway POP 18, and for that reason, the traffic multiplexing mechanism 24 is located upstream therefrom.)

As seen in FIG. 2, the traffic multiplexing mechanism 24 may take the form of an optical switch for routing traffic onto and off the service fiber $22_1$ when the express traffic link 20 comprises an optical cable. Other types of multiplexing mechanisms 24 may be utilized to inject traffic into, and to extract traffic from, the express traffic link 20 when the link is other than an optical cable.

The optical switch 24 is coupled by a link 26 to a piece of Line Termination Equipment (LTE) 28. The LTE 28 is coupled by a link 29 to a central office telephone switch 30 within the local exchange $12_5$, such as a 5ESS telephone switch made by AT&T. The switch 30, in turn, is coupled via a link 34 to an LTE 36 that terminates the local trunk 16 at the local exchange $12_5$. (Each of the other local exchanges, such as the local exchange $12_1$, also contains an LTE 36 for terminating the local trunk 16 at that exchange.)

During normal operation of the network 10 of FIGS. 1 and 2 (i.e., during intervals while the local trunk 16 remains intact), inter-LATA traffic passes on the local trunk 16 between each of the dead-ended exchanges $12_2$–$12_5$ in FIG. 1 and to the local exchange $12_1$ for routing onto and off of the gateway POP 18 in that exchange. From the gateway POP 18 in the local exchange $12_1$, the inter-exchange carrier carries the traffic between its gateway POP 18 in the local exchange $12_1$ and the intended destination for such traffic (for example, the local exchanges $12_7$ or $12_8$).

Now, assume that the local trunk 16 fails between the local exchanges $12_1$ and $12_2$, as indicated by an X in FIG. 2. Such a failure may occur when the local trunk 16 is partially or fully severed or the trunk can no longer carry its normal volume of traffic. Once the local trunk 16 fails between the local exchanges $12_1$ and $12_2$, traffic no longer passes between these exchanges. However, the remaining portion of the trunk 16 passing through the local exchanges $12_2$–$12_5$ is presumed operative so that traffic may pass between these exchanges. However, any inter-LATA traffic, as well as any intra-LATA traffic bound for the local exchange $12_1$ will be blocked.

In accordance with the invention, should the local trunk 16 fail between the local exchanges $12_1$ and $12_2$, then the optical switch 24 at the local exchange $12_5$ is rendered operative to inject or route outbound traffic from any of the exchanges $12_2$–$12_5$ intended for the local exchange $12_1$, or for the gateway POP 18 at that exchange, onto the express traffic link 20. Local traffic from any of the dead-ended local exchanges $12_2$–$12_5$ destined for the local exchange $12_1$ now passes to the gateway POP 18 in the local exchange $12_7$, as seen in FIG. 2 for passage to the POP 18 in the local exchange $12_1$ for distribution in that exchange. Depending on the traffic within the network 10, it may be necessary to route the local traffic destined for the local exchange $12_1$ now at the POP in the local exchange $12_7$ to a chain of several different POPs rather than the POP in the local exchange $12_8$. Ultimately, such traffic passes to the POP 18 at the local exchange $12_1$ for distribution in that exchange.

The inter-exchange traffic injected into the express traffic link 20 passing through the local exchange $12_5$ is routed to the POP 18 in the local exchange $12_7$ and from there to the intended destination of such traffic, via the inter-exchange carrier's network. For example, such inter-exchange traffic may be intended for the local exchange $12_8$. Thus, the inter-exchange traffic received at the POP 18 in the local exchange $12_7$ from any of the dead-ended local exchanges $12_2$–$12_5$ now passes to the POP 18 in the local exchange $12_8$.

Only the routing of outbound traffic from the dead-ended local exchanges $12_2$–$12_5$ has been described thus far. Inbound traffic, that would normally be routed to the dead-ended local exchanges $12_2$–$12_5$ from the local exchange $12_1$ but for the failed portion of the local trunk 16, is now is first routed to the POP 18 in the local exchange $12_7$. From the POP 18 in the local exchange $12_7$, the traffic is routed via the express traffic link 20 to the optical switch 24 that withdraws or routs such traffic off the express traffic link for distribution to its intended destination within one of the dead-ended local exchanges $12_2$–$12_5$. To facilitate such routing, the gateway POP 18 at the local exchange $12_7$ downstream of the optical switch 24 is provided with a Digital Maintenance System (DMS) 38 having one or more pre-maps that indicate the presence of the optical switch and the appropriate traffic pattern resulting upon actuation of the switch.

By routing traffic between the dead-ended local exchanges $12_2$–$12_5$ and the POP 18 at the local exchange $12_7$ along the express traffic link 20, service between the local exchange $12_1$ and the dead-ended local exchanges can be restored quickly in the event the local trunk 16 fails between the local exchanges $12_1$ and $12_2$. No longer must a subscriber lit any of the dead-ended local exchanges $12_2$–$12_5$ wait for physical restoration of the failed local trunk 16 in order to receive service.

The foregoing describes a technique for restoring telecommunications service between a dead-ended local exchange and an inter-exchange carrier Point-Of-Presence at another local exchange.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. In combination with a telecommunications network including a first local exchange at which an inter-exchange carrier has a first Point-Of-Presence, a dead-ended second local exchange coupled to the first exchange by a local trunk, and at least a third local exchange at which the inter-exchange carrier has a second gateway POP linked to the first gateway POP by an express traffic link that passes through the second, dead-ended exchange, the improvement comprising:

a traffic-routing mechanism at the dead-ended second local exchange for routing traffic, otherwise intended for passage on the local trunk to and from the first gateway POP, onto and off the express traffic link for passage to and from the second gateway POP in the event of a failure of the local mink between the dead-ended second local exchange and the first local exchange.

2. The apparatus according to claim 1 wherein the express traffic link comprises at least one optical fiber and wherein the traffic routing mechanism comprises an optical switch for injecting traffic into, and withdrawing traffic from the optical fiber.

3. The apparatus according to claim 2 wherein the second gateway POP has at least one pre-map containing routing information indicating the presence of the optical switch and the traffic pattern resulting upon actuation of the switch.

4. A method for re-routing telecommunications traffic, destined for passage between an inter-exchange carrier, having a first gateway Point-Of-Presence (POP) at a first local exchange, and a second, dead-ended local exchange when a potion of a local trunk, linking the first exchange and the second dead-ended local exchange has now failed, comprising the steps of:

routing traffic, originally intended to pass between the second, dead-ended local exchange and the first gateway POP, via the now-failed portion of the local mink, onto and off an express traffic link that passes through, but not otherwise connected to, the second dead-ended local exchange to run between the first gateway POP and a second gateway POP of the inter-exchange career at a third local exchange downstream of the failed portion of the local trunk, upon the failure of said trunk portion; and routing traffic, now on the express traffic link, between the second gateway POP at the third local exchange and intended destination, so traffic passes between the destination and the third local exchange.

5. The method according to claim 4 wherein the intended destination is the first local exchange and wherein the traffic is routed via a second express link from the second gateway POP to the first gateway POP at said first local exchange.

6. The method according to claim 4 wherein the first express traffic link comprises at least one optical fiber and wherein the step of routing traffic onto and off the express traffic link comprises the step of injecting traffic into and withdrawing traffic from the optical fiber via an optical switch.

7. The method according to claim 4 wherein the traffic routed onto and off the express traffic link is destined, for the second, dead-ended local exchange.

8. The method according to claim 4 wherein the traffic routed onto and off the express traffic link is destined for a fourth local exchange coupled to the local trunk downstream of the second, dead-ended local exchange so the fourth local exchange is also dead-ended.

* * * * *